(12) United States Patent
Garcia et al.

(10) Patent No.: US 6,406,031 B1
(45) Date of Patent: Jun. 18, 2002

(54) SHAFT SEAL

(75) Inventors: Christopher S. Garcia, Rochester; Paul E. Thompson, Webster; Kenneth M. Patterson, Hilton; Blaise P. Pelligra, Webster, all of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/675,411

(22) Filed: Sep. 29, 2000

(51) Int. Cl.⁷ .............................. F16J 15/34; F16J 15/18
(52) U.S. Cl. ........................ 277/407; 277/535; 277/540; 277/937; 277/938; 277/945
(58) Field of Search ................................ 277/404, 407, 277/534, 535, 536, 540, 342, 945, 937, 938

(56) References Cited

U.S. PATENT DOCUMENTS 4,042,248 A * 8/1977 Williamitis
4,125,267 A * 11/1978 Rathburn
6,062,570 A * 5/2000 Erickson ................ 277/529

OTHER PUBLICATIONS

"Waldes Truarc Retaining Rings and Assembly Tools (Technical Manual) Design Data and Engineering Specifications" Waldes Kohinoor, Inc. 47–16 Austel Place, P.O. Box 1030, Long Island City, N.Y. 11101 (no date).
Rogers Corp: Poron Industrial Materials (web page) 245 Woodstock Road, Woodstock, CT 06281–1815 (no date).

* cited by examiner

*Primary Examiner*—Anthony Knight
*Assistant Examiner*—Alison K. Pickard

(57) ABSTRACT

A seal for a rotary shaft extending from a container containing agitated abrasive particulates through a wall of the container. The seal includes a first polymeric member around the shaft and in engagement with the wall of the container with the shaft rotating inside the first member. The first member is in engagement with a second polymeric member positioned around the shaft for rotation with the shaft and relative to the first member. A third compressible member is positioned around the shaft for rotation with the shaft and the second member. A retaining ring maintains the first, second and third members in compression between the retaining ring and the wall.

9 Claims, 1 Drawing Sheet

SHAFT SEAL

FIELD OF THE INVENTION

This invention relates to an improved shaft seal for a rotary shaft extending from a container containing agitated abrasive particulate solids through a wall of the container.

BACKGROUND OF THE INVENTION

In the operation of copier/duplicator machines, a conductor film is used to transfer an image from an original to a copy. The photo-conductor film is initially charged at a corona charger or the like and then passed to an imaging section where a charged image is placed on the conductor film. The film then passes to a section where a developer and toner are used to deposit a the toner on the charged image. In this section the developer, which is a finely divided magnetic metallic oxide such as iron oxide, becomes associated with toner which is then passed into close proximity to the conductor film which attracts the toner to the charged image. The developer and toner are retained in a developer sump, which includes a rotary blender, optionally a rotary bucket shell and a rotary toner shell or the like, which move the blend of toner and developer into proximity to the photo-conductor film. These components are powered by shafts extending through the wall of the container of developer and toner. The developer is a particularly abrasive material and it has been difficult to develop seals which will provide extended life to bearings and other components used to provide power to the blender, bucket shell, toner shell or the like inside the developer/toner sump.

The failure of these bearings is particularly serious since they are not readily replaced in the field by a service representative. Since these bearings cannot be replaced in the field, they require replacement of the entire sump when bearing failures occur. Further the escape of developer and toner can result in the presence of undesired contaminants in the copier/duplicator machine.

Accordingly a continuing search has been directed to the development of improved seals for such shafts.

SUMMARY OF THE INVENTION

According to the present invention, an improved seal for a shaft extending from a container containing agitated abrasive particulates through a wall of the container is provided by a seal comprising: a polymeric first washer member having a first side and a second side and sealingly positioned at its first side against the wall of the container and sealingly positioned around the shaft for rotation of the shaft inside the first washer member; a polymeric second washer member having a first side and a second side and sealingly positioned around the shaft with its first side in contact with the second side of the first member for rotation of the second member with the shaft and for rotation of the first side of the second member relative to the second side of the first member; a polymeric compressible foam third washer member having a first side and a second side and sealingly positioned around the shaft with its first side in contact with the second side of the second member for rotation with the shaft and the second member; and, a retaining member having a first side and a second side and positioned at least partially around the shaft in a groove in the shaft with its first side in engagement with the second side of the third member for rotation with the shaft and the third member, the groove being positioned to retain the first member, the second member and the third member in compression between the retaining ring and the wall of the container.

DESCRIPTION OF THE FIGURE

The FIGURE is a schematic diagram of a shaft extending through a wall of a container containing abrasive solids and including a seal according to the present invention.

DESCRIPTION OF THE PREFERRED EMBODIMENTS

Figure 1:
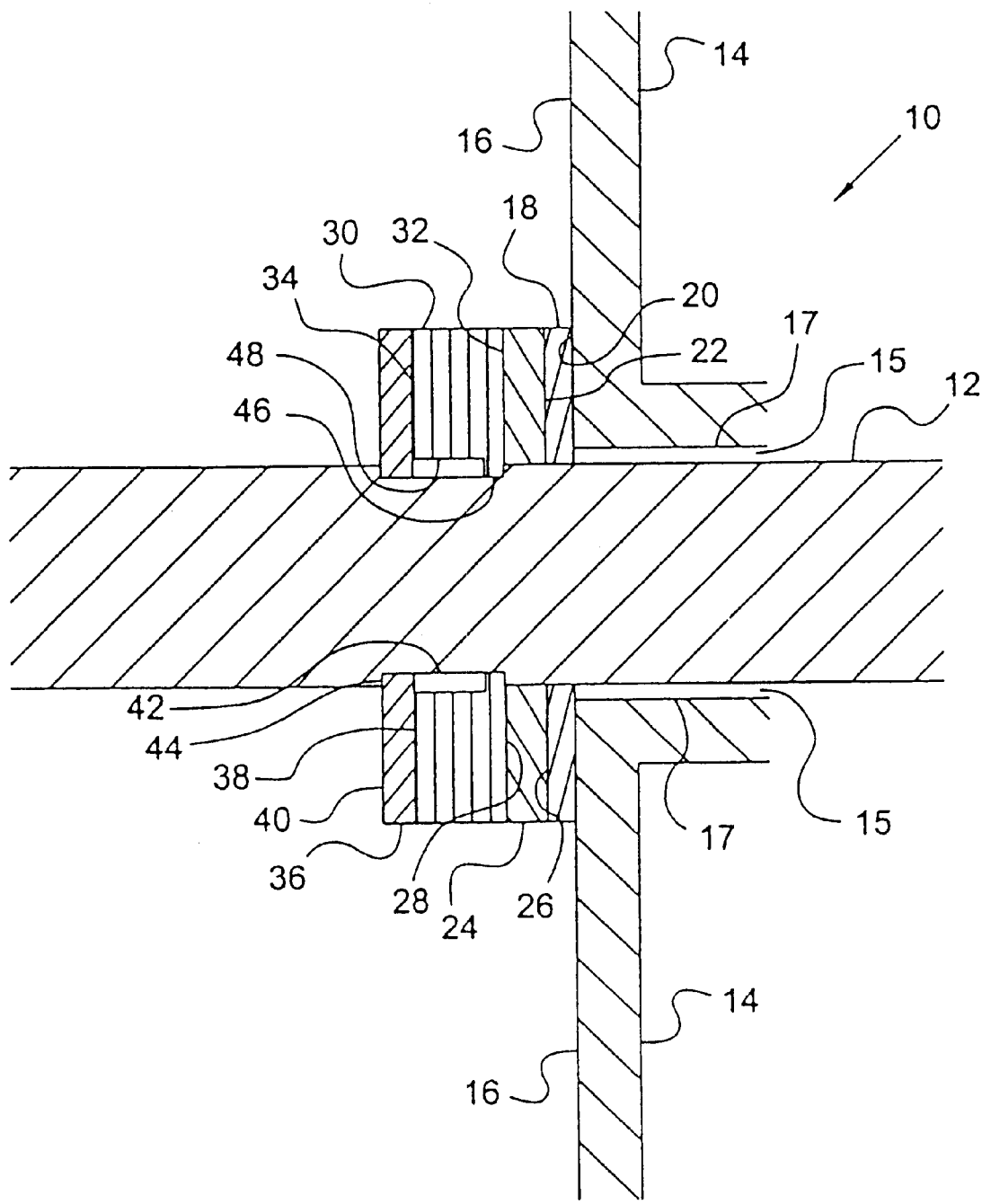

In FIG. 1, a shaft seal 10 is shown around a shaft 12 extending through a wall 14 which may be a developer sump wall of a copier/duplicator machine. Gears, bearings and the like required to operate equipment inside the sump are not shown but are positioned to engage shaft 12 outside wall 14. Shaft 12 as shown extends through wall 14, which is typically a cast metal, such as aluminum, wall. Accordingly a space 15 exists around shaft 12 and between shaft 12 and a passageway 17 through wall 14. If developer is allowed to move into and along space 15 between the outside of shaft 12 and the inside of passageway 17 it is extremely detrimental to shaft bearings, gears and the like and has resulted in a very short life for these components. Various attempts have been made to sealingly contain the developer inside the developer sump but in all instances the seals have exhibited a relatively short life.

According to the present invention, a first member 18 is positioned around shaft 12 with its first side 20 against inside wall 16 of the sump. Typically, inside wall 16 is not machined and is a relatively rough surface with a relatively high coefficient of friction. First member 18 is typically formed as a washer, which is sealingly positioned around shaft 12. Desirably, member 18 is formed of a polymeric material, having a high abrasion resistance. While first member 18 is designed to remain stationary relative to wall 16 because of the high coefficient of friction with wall 16, it may encounter occasional slight movement against wall 16. Substantially any suitable polymeric material, such as tetrafluoroethylene, TEFLON (trademark of Du Pont, 1007 Market Street, Delaware 19898), may be used. A suitable material for first member 18 is silicone impregnated tetrafluoroethylene. A preferred silicone impregnated tetrafluoroethylene washer is available from Waldes Kohinoor Inc. 41-16 Austel Place, Long Island City, N.Y., 11101 under the trademark GLYCON, Style 3500'. These washers are effective in the present invention. Other polymeric materials could also be used so long as they provide sufficient abrasion resistance and a sufficiently low friction with a second member 24.

Second member 24 is also sealingly positioned around shaft 12 and has its first side 26 positioned against second side 22 of the first member. Second member 24 is desirably of a polymeric material (such as tetrafluoroethylene), which exhibits a low coefficient of friction with first member 18. Second member 24 is sealingly positioned on shaft 12 and is designed to rotate with shaft 12. Accordingly, the rotation of the shaft is accommodated in the seal by the rotation of second member 24 against the low friction surfaces of first member 18. Preferably the coefficient of friction between first member 18 and second member 24 is from about 0.15 to about 0.35.

A particularly suitable material for use in the fabrication of second member 24, which is also typically fabricated as a washer adapted to sealingly fit over shaft 12, is a graphite—filled tetrafluoroethylene available from Waldes Kohinoor Inc, 47-16 Austel Place, Log Island City, N.Y., 11101 under the trademark GLYCON, Style 3530. The materials described above are particularly suitable for second member 24. Substantially any polymeric material having a suitable coefficient of friction with first member 18 at the conditions in the developer sump can be used for either first member 18 or second member 24. A second side 28 of second member 24 is positioned in contact with a first side 32 of a third member 30.

Third member 30 is desirably a polymeric foam having a suitable density and a suitable compressibility and is configured as a washer—like member around shaft 12. Desirably third member 30 has a compressibility of from about 1.9 to about 3.6 pounds per inch. Any suitable polymeric foam, may be used, although cellular urethane polymers are preferred. A suitable polymeric foam washer is available from Rogers Corporation, 245 Woodstock Road, Connecticut 06281-1815 under the trademark PORON. Washers of a very low modulus to washers of a very high modulus are available. While these materials are suitable, any foam of a density sufficient to maintain pressure between a retaining ring 36 and first member 18 and second member 24 at the temperature in the developer sump is suitable. Third member 30 is designed to rotate with shaft 12 and is in compression with its first side 32 against a second side 28 of second member 24.

As shown, retaining ring 36 is positioned with its first side 38 against a second side 34 of third member 30. Retaining ring 36 maintains compression on third member 30, which in turn maintains pressure on first member 18 and second member 24. The entire seal assembly is thus maintained in compression. Retaining ring 36 is retained in position relative to shaft 12 by a groove 42 which includes a shoulder 44 which axially restrains retaining ring 36. Groove 42 has a length along the length of shaft 12 greater than the width of retaining ring 36. This permits the assembly of the seal components on shaft 12 in an uncompressed position with the shaft then being passed through opening 17 and pushed into compression by the interaction of shoulder 44 on shaft 12 with retaining ring 36 and the remaining components of the seal. The shaft is then retained in position so that shaft seal 10 remains in compression.

Retaining ring 36 may be of any suitable material having sufficient strength to retain first, second and third members in compression. Retaining ring 36 may be a spring ring which extends around about 270° of the outside of shaft 12. A wide variety of materials such as steel, stainless steel, beryllium copper and the like may be used to fabricate retaining ring 36.

Third member 30 as shown includes a section 46 which is in contact with shaft 12 and centers member 30 around shaft 12. A section 48 of third member 30 opposite groove 42 is free to radially expand as member 30 is compressed.

By the combination of components and features of the present invention, the motion between seal components is limited to the rotary interaction between first member 18 and second member 24. Both these elements are polymeric materials, which have relatively low coefficients of friction so that they freely rotate relative to each other. First member 18 is retained in position relative to wall 14 by the high coefficient of friction between the first side of first member 18 and the inside 16 of wall 14. This results in the interaction of the sealing elements being limited to movement between two very low coefficient of friction surfaces. These surfaces are maintained in compressive engagement by retaining ring 36 and third member 30 which remains in compression and exerts compression on first member 18 and second member 24. This arrangement is very effective to prevent the escape of developer and toner from the developer sump through opening 17 and the like. The use of these components provides longer service life and greater reliability then previously available materials. Further this design is effective over a wide range of tolerances and since it retains the developer and toner in the sump, it greatly improves the life of the bearings and related materials which are used to operate the blender, bucket shell, toner shell and the like inside the sump. The net result is much longer service life for the developer/toner sump and greatly reduced risk of the escape of contaminants into the copier/duplicator machine. Further since the seal is retained in compression against wall 14 by shaft retainers outside wall 14, less shaft motion is experienced in the bearings and gears outside wall 14. The net result is a substantial improvement in a sump life.

Having thus described by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon the foregoing description of preferred embodiments.

Having thus described the invention, we claim:

1. A seal for a rotary shaft extending from a container containing agitated abrasive particulates through a wall of the container, the seal comprising:
   a) a polymeric first washer member having a first side and a second side and sealingly positioned at its first side against the wall of the container and sealingly positioned around the shaft for rotation of the shaft inside the washer member;
   b) a polymeric second washer member having a first side and a second side and sealingly positioned around the shaft with its first side in contact with the second side of the first member for rotation of the second member with the shaft and for rotation of the first side of the second member relative to the second side of the first member;
   c) a polymeric compressible foam third washer member having a first side and a second side and sealingly positioned around the shaft with its first side in contact with the second side of the second member for rotation with the shaft and the second member; and,
   d) a retaining member having a first side and a second side and positioned at least partially around the shaft at its second side in a groove in the shaft with its first side in engagement with the second side of the third member for rotation with the shaft and the third member, the groove being positioned to retain the first member, the second member and the third member in compression between the retaining ring and the wall of the container.

2. The seal of claim 1 wherein the wall of the container comprises an abrasive surface.

3. The seal of claim 1 wherein the coefficient of friction between the first side of the second member and the second side of the first member is less than the coefficient of friction between the first side of the first member and the wall of the container.

4. The seal of claim 1 wherein the groove has a length along the shaft greater than the width of the retaining ring.

5. The seal of claim 1 wherein the third member engages the shaft along a portion of its width.

6. The seal of claim 1 wherein the first member comprises silicone impregnated tetrafluoroethylene.

7. The seal of claim 1 wherein the second member comprises a graphite filled tetrofluoroethylene.

8. The seal of claim 1 wherein the third member comprises a urethane foam.

9. The seal of claim 1 wherein the fourth member comprises steel, stainless steel or Beryllium copper.

* * * * *